(12) United States Patent
Dettinger et al.

(10) Patent No.: US 7,787,405 B2
(45) Date of Patent: Aug. 31, 2010

(54) METHOD FOR UTILIZATION OF ACTIVE POWER PROFILES USED IN PREDICTION OF POWER RESERVES FOR REMOTE DEVICES

(75) Inventors: Richard D. Dettinger, Rochester, MN (US); Zachary A. Garbow, Rochester, MN (US); Frederick A. Kulack, Rochester, MN (US); Kevin G. Paterson, San Antonio, TX (US); Candace T. Pederson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 751 days.

(21) Appl. No.: 11/620,910

(22) Filed: Jan. 8, 2007

(65) Prior Publication Data

US 2008/0165714 A1 Jul. 10, 2008

(51) Int. Cl.
*G08C 17/00* (2006.01)
(52) U.S. Cl. ...................... 370/311; 455/574
(58) Field of Classification Search ............. 370/311; 455/572–574, 343.1–343.5, 13.4, 127.5; 340/7.32–7.38; 713/320–324, 330, 340
See application file for complete search history.

(56) References Cited

U.S. PATENT DOCUMENTS

| | | | |
|---|---|---|---|
| 6,463,305 B1 * | 10/2002 | Crane | 455/566 |
| 6,532,375 B2 * | 3/2003 | Cathey et al. | 455/574 |
| 2004/0041538 A1 * | 3/2004 | Sklovsky | 320/127 |
| 2005/0025296 A1 * | 2/2005 | Benco et al. | 379/88.22 |
| 2005/0125701 A1 * | 6/2005 | Hensbergen et al. | 713/320 |
| 2006/0059379 A1 * | 3/2006 | Tanaka | 713/300 |
| 2006/0135217 A1 * | 6/2006 | Sung et al. | 455/573 |
| 2007/0226527 A1 * | 9/2007 | Ang | 713/320 |
| 2007/0252552 A1 * | 11/2007 | Walrath | 320/107 |

OTHER PUBLICATIONS

Cell Phones Demand Better Battery Life, [online]; [retrieved Oct. 18, 2006]; retrieved from the Internet at: http://www.wsdmag.com/articles/articleID/8629/8629.html.
Citations: Predictive power conservation-Wilkes(ResearchIndex), [online]; [retrieved Oct. 18, 2006]; retrieved from the Internet at: http://citeseerist.psu.edu/context/192718/0.

* cited by examiner

*Primary Examiner*—Kent Chang
*Assistant Examiner*—Marcus Hammonds
(74) *Attorney, Agent, or Firm*—Cantor Colburn LLP; James R. Nock

(57) ABSTRACT

A method for the dynamically determining utilization of remote device applications based on historical application usage patterns, application power requirements, and available power reserves stored on a remote device, wherein the method includes defining a set of individual applications and activities on a remote device; determining a rate of power consumption per unit of time for each of the set of individual applications and activities; determining usage patterns of the set of individual applications and activities; determining a total expected power usage; comparing the total expected power usage to the available power reserves; and implementing a power budget if the total expected power usage exceeds the available power reserves.

2 Claims, 2 Drawing Sheets

METHOD FOR UTILIZATION OF ACTIVE POWER PROFILES USED IN PREDICTION OF POWER RESERVES FOR REMOTE DEVICES

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates generally to software that manages active power profiles, and more particularly to a method and article for the dynamic determination of an optimal utilization of remote device applications based on historical application usage patterns, application power requirements, and available power reserves stored on a remote device.

2. Description of the Related Art

As portable electronic devices have continued to evolve their level of sophistication and abilities to carryout a myriad of applications have progressed as well. Initially, a portable electronic device was dedicated to voice communication, such as a cell phone, or to basic computing functions and scheduling, such as a personal digital assistant (PDA). However, the present generation of portable devices has combined computing and voice communications in a single unit, while offering additional features of data communication over the Internet, delivery of multimedia content (video/audio), as well as gaming functions. The increased functionality of the present generation of portable devices has increased their usage throughout the user's day, and placed additional energy demands on the portable device's power source. Despite the increased energy demands, the continued miniaturization of these devices has continued to reduce the amount of space allocated to the portable device's power sources. Furthermore, despite advances in materials that have improved electronic device efficiency, and that have allowed for increased energy storage per unit area, the user demands placed on portable electronic devices has continued to outpace the ability to power the device for extended periods of time. For example, cell phones normally have a maximum of 2 to 4 hours of talk time between a required recharge, while other applications on the cell phone such as Internet access or playing a pre-recorded audio, such as a stored MP3, decrease the amount of talk time considerably below the maximum.

Presently employed power management techniques, such as switching electronic devices into power saving and standby modes after a predetermined amount of dormancy, or switching off screens after initiating a phone connection, have contributed to extending device operation between required recharging. However, many of today's applications, such as streaming video and Internet browsing, require constant display as well as a continuous radio frequency (RF) connection. Therefore, existing power management techniques are inadequate to address the electronic device power consumption profiles that are increasing faster than their power supply profiles.

SUMMARY OF THE INVENTION

A method for dynamically determining utilization of remote device applications based on historical application usage patterns, application power requirements, and available power reserves stored on a remote device. The method includes: defining a set of individual applications and activities on a remote device; determining a rate of power consumption per unit of time for each of the set of individual applications and activities; determining usage patterns of the set of individual applications and activities; determining a total expected power usage; comparing the total expected power usage to the available power reserves; and implementing a power budget if the total expected power usage exceeds the available power reserves.

An article comprising machine-readable storage media containing instructions is also provided that when executed by a processor enable the processor to perform a dynamic determination for the utilization of remote device applications based on historical application usage patterns, application power requirements, and available power reserves stored on a remote device, wherein the remote device comprises: laptop computers, mobile computing devices, mobile communication devices, and personal digital assistants (PDA).

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
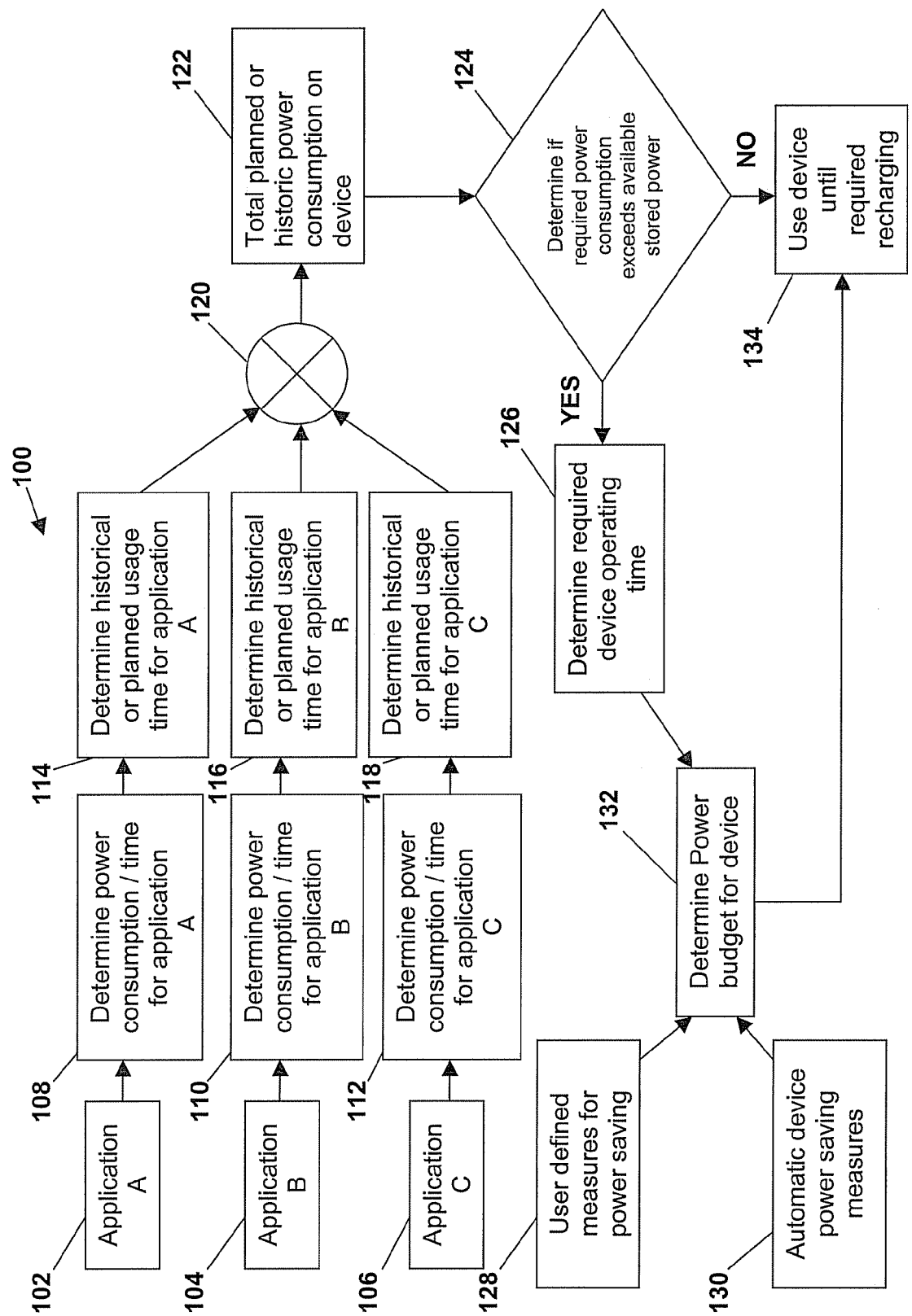
FIG. 1 is a flowchart illustrating the establishment of a power budget for a portable electronic device based on a device's utility, applications, historical usage, required operating time, and available power reserve according to an embodiment of the present invention.

The detailed description explains the preferred embodiments of the invention, together with advantages and features, by way of example with reference to the drawing.

DETAILED DESCRIPTION OF SPECIFIC EMBODIMENTS

Embodiments of the present invention provide a method and article for the dynamic determination of an optimal utilization of remote device applications based on historical application usage patterns, application power requirements, and available power reserves stored on the remote device.

Portable electronic devices generally offer communication services including voice and data (Internet), calendaring, and an application suite. A typical application suite includes, for example, email, e-books, digital audio, podcasts, videocasts, and gaming. Each of the communication services and applications has a unique average power draw requirement. Users of portable electronic devices typically establish a pattern of usage during a defined period of time. For example, entertainment options in the application suite may be used during commuting times in the morning and evening, whereas business related applications are conducted between commutes. In addition, the electronic device usage pattern can also be related to events that are scheduled on the device's calendar, incoming and outgoing phone calls scheduled and manually started applications.

Taking into account a user's pattern of usage of a portable electronic device, and the unique power requirement profiles of the various applications on the device, a power budget can be established to ensure the desired operability of the electronic device for a user-defined period between recharging sessions. By establishing a power budget, the device can provide usage feedback to the user, and reschedule applications to conserve power, so as to provide continuous operability between recharging. By setting priorities and limits on the various applications, the user can ensure that they can efficiently use their portable electronic device for a predetermined period of time.

Examples of establishing power profiles to enact a power budget are as follows:

Meetings, as scheduled on a device's calendar, typically may have a repeating quality with similar device usage patterns. During certain meetings a device may be used for note taking, email sending or other tasks. An association between these actions, their power requirements, and the meetings are made. The result is a meeting power profile, describing the average power usage characteristics during the meetings. Thus the device can determine what percentage of the power budget, on a given day, needs to be set aside for scheduled meetings according to the device's internal calendar.

In terms of incoming and outgoing phone calls, information about the duration of the phone call can be recorded. In addition, statistics about frequency and timing of calls are also gathered. The result is that for a user in the contact list, a contact power profile is created, describing the average (and predicted) power usage characteristics for phone calls with this contact. The resulting estimate for the power usage related to phone usage is another element within the power budget.

Scheduled and manually started applications also contribute to the power budget. The device may have scheduled applications, including synchronizing with PCs, downloading email from the wireless network, or downloading media (podcasts). Manually started applications include, for example, using an e-book, playing games, or listening to MP3. These applications tend to be somewhat consistent in their usage patterns, and their times of use during a typical user day, such as during commuting. The applications and their schedules (automated or manual) are used to create an application power profile for use in calculating a power budget.

A user-defined period between recharging sessions (target time duration) is also used in determining the power budget. Based on activities anticipated during the duration of time, including scheduled meetings, scheduled applications and expected applications and phone calls, a power budget is made for the power reserve capacity of the portable electronic device's power source. If the predicted power usage of the device is greater than its power reserve, a power budget will be established in order to ensure the user of adequate device operation during the target duration.

Actions taken to establish a power budget, when the user's planned or anticipated power demands exceed the electronic device's power reserve include altering or minimizing the power consumption of the device's main tasks by:

A) Changing ring tones on the device when incoming calls occur, indicating a call that should be "kept short".
B) Recommending call durations to the user based on a priority list determined by the user.
C) Changing meeting notifications or posting an alert on the device that indicates a less "active" meeting should be conducted.
D) Canceling or deferring scheduled applications, such as file backups and virus scans, within constraints provided by the user.
E) Adjusting display screen brightness and resolution.
F) Running in a reduced processing mode with a reduced internal clock speed.

The magnitude of the suggested or automated power saving actions is based on the ratio of predicted power usage versus current power availability. If the predicted usage for the targeted period of time greatly exceeds the current battery life, more drastic measures are taken and suggested by the system, including limiting user defined nonessential activities such as gaming, MP3 playing, speaker phone features, etc.

A user interface screen that manages the planning of the power budget can be provided to the device user, as well as graphics illustrating usage, application power consumption rates and other power metrics, such as estimates of time of available charge based on historical usage patterns, can be provided in an embodiment of the present invention. The user interface can recommend short charging intervals that may provide adequate operating time for required user intervals. For example, a 5 minute charge may provide enough power to keep the device operational for an hour and keep the user within the operational power budget. In addition, the user interface can provide prompts and user advisories when charging is required, as well as alerts when imminent shut down will occur.

FIG. 1 is a flowchart that describes a process for establishing a power budget for a portable electronic device based on a device's utility, applications, historical usage, required operating time, and available power reserve according to an embodiment of the present invention. The exemplary process 100 describes a situation where a device has three applications A, B, and C (102, 104, and 106, respectively) each with a unique power usage profile (power consumption/time) (108, 110, and 112, respectively). Each of the applications 102, 104, and 106 has historical usage patterns or times, or planned usage times by the user (114, 116, and 118, respectively). Combining the application usage information (114, 116, and 118) with the power consumption (108, 110, and 112) results in a power usage, which is summed 120 to provide a total planned or historic power consumption of the device 122. If the total power consumption does not exceed the available stored power of the device 124, the operation of the device continues until the next required or available opportunity to charge the device 134. If the total power does exceed the available stored power 124, steps 126, 128, and 130 are taken to establish a power budget 132. In step 124, the user defines the required period of time that the device will have to perform for before it will be recharged. In another embodiment of the present invention, the device itself can determine what the typical interval between charges is. In step 128, user defined actions to conserve power are implemented such as shortening phone conversations are taken. In step 130 automatic power saving measures are taken by the device such as dimming displays, delaying optional device tasks, and sending conservation timing reminders and notifications to the user. By establishing a power budget 132, the device can remain active until its next scheduled recharge 134.

Figure 2:
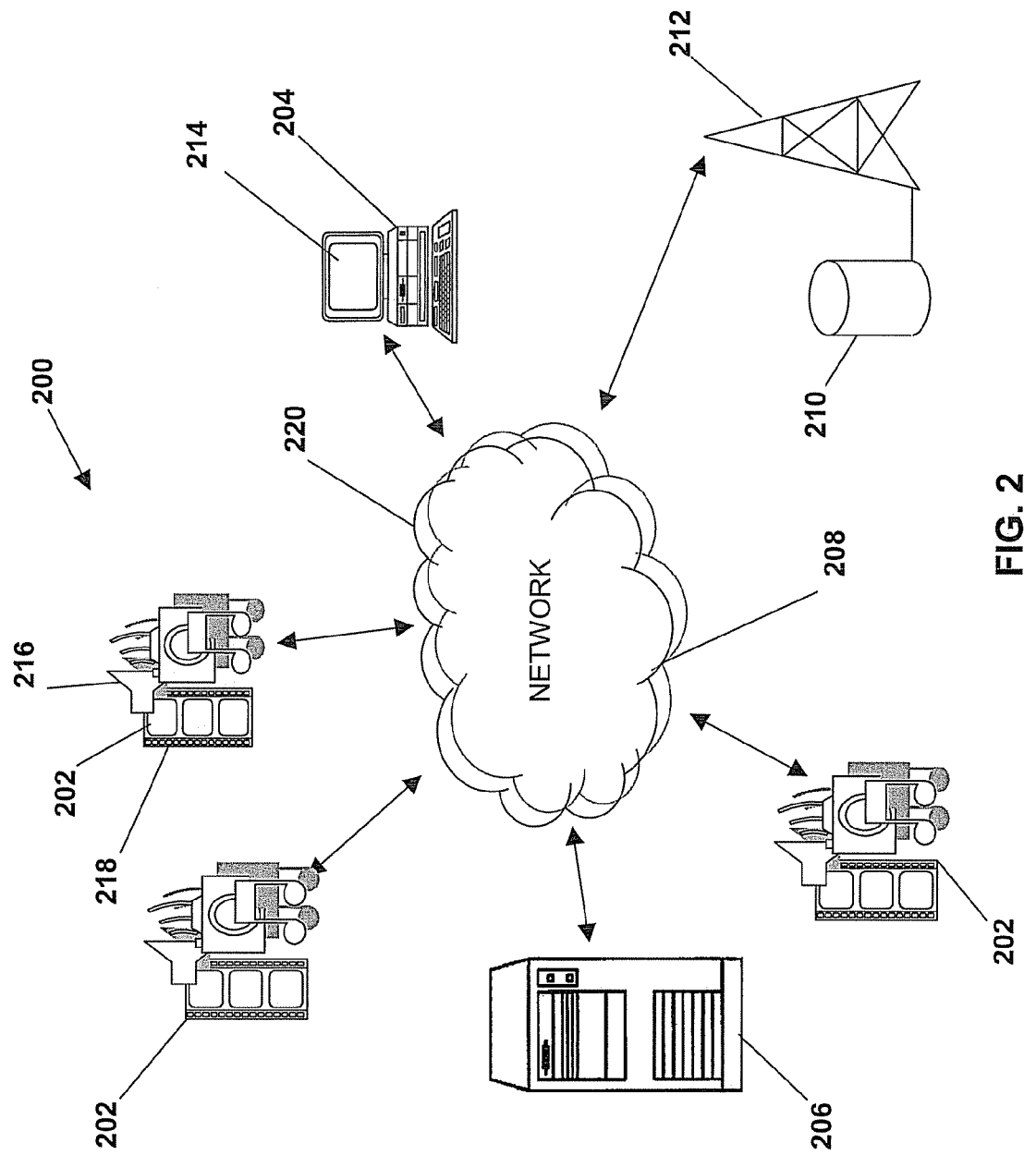
FIG. 2 is a block diagram of an exemplary system for implementing the power management/budget for remote devices according to an embodiment of the present invention.

FIG. 2 is a block diagram of an exemplary system 200 for implementing the power management/budget of the present invention and graphically illustrates how those blocks interact in operation. The system 200 includes remote devices including one or more multimedia/communication devices 202 equipped with speakers 216 for implementing the audio aspects of the present invention, as well as display capabilities 218 for facilitating the graphical user interface (GUI) aspects of the present invention. In addition, mobile computing devices 204 equipped with displays 214 for use with the GUI of the present invention are also illustrated. The remote devices 202 and 204 may be wirelessly connected to a network 220. The network 220 may be any type of known network including a local area network (LAN), wide area network (WAN), global network (e.g., Internet), intranet, etc. with data/Internet capabilities as represented by server 206. Communication aspects of the network are represented by cellular base station 210 and antenna 212. Each remote device 202 and 204 may be implemented using a general-purpose computer executing a computer program for carrying out the power management processes described herein. The computer program may be resident on a storage medium local to the remote devices 202 and 204, or maybe stored on the server system 206 or cellular base station 210. The server system 206 may belong to a public service. The remote devices 202 and 204 may be coupled to the server system 206 through multiple networks (e.g., intranet and Internet) so that not all remote devices 202 and 204 are coupled to the server system 206 via the same network. The remote devices 202 and 204 and the server system 206 may be connected to the network 220 in a wireless fashion, and network 220 may be a wireless network. In a preferred embodiment, the network 220 is a LAN and each remote device 202 and 204 executes a user interface application (e.g., web browser) to contact the server system 206 through the network 220. Alternatively, the remote devices 202 and 204 may be implemented using a device programmed primarily for accessing network 220 such as a remote client.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for dynamically determining utilization of remote device applications based on historical application usage patterns, application power requirements, and available power reserves stored on a remote device, wherein the method comprises:

defining a set of individual applications and activities on a remote device;

determining a rate of power consumption per unit of time for each of the set of individual applications and activities;

determining usage patterns of the set of individual applications and activities;

determining a total expected power usage;

comparing the total expected power usage to the available power reserves; and implementing a power budget whenever the total expected power usage exceeds the available power reserves, including the steps of:

determining the required operating time of the remote device is based on the user determining the period between recharging the remote device;

determining user defined power saving measures; and implementing power saving measures initiated by the remote device, the implementing comprising:

altering ring tones to indicate incoming calls that should be kept short in duration;

recommending incoming and outgoing call durations based on a user determined priority list; and altering notifications and providing user alerts.

2. An article comprising non-transitory machine-readable storage media containing instructions that when executed by a processor enable the processor to perform a dynamic determination for the utilization of remote device applications based on historical application usage patterns, application power requirements, and available power reserves stored on a remote device, wherein the remote device comprises: laptop computers, mobile computing devices, mobile communications device, and personal digital assistants (PDA); wherein the instructions comprise algorithms for implementing a power budget; and wherein the algorithm further comprises: defining a set of individual applications and activities on a remote device; determining a rate of power consumption per unit of time for each of the set of individual applications and activities; determining usage patterns of the set of individual applications and activities; determining a total expected power usage; comparing the total expected power usage to the available power reserves; and implementing a power budget whenever the total expected power usage exceeds the available power reserves, wherein the implementing comprises: determining the required operating time of the remote device based upon a user determining the period between recharging the remote device; determining user defined power saving measures; and implementing power saving measures initiated by the remote device comprising the steps of: altering ring tones to indicate incoming calls that should be kept short in duration; recommending incoming and outgoing call durations based on a user determined priority list; and altering notifications and providing user alerts.

* * * * *